United States Patent
Pelka et al.

(10) Patent No.: US 6,637,924 B2
(45) Date of Patent: Oct. 28, 2003

(54) STRIP LIGHTING APPARATUS AND METHOD

(75) Inventors: David G. Pelka, Los Angeles, CA (US); William A. Parkyn, Lomita, CA (US)

(73) Assignee: Teledyne Lighting and Display Products, Inc., Hawthorne, CA (US)

( * ) Notice: Subject to any disclaimer, the term of this patent is extended or adjusted under 35 U.S.C. 154(b) by 0 days.

(21) Appl. No.: 09/993,286

(22) Filed: Nov. 14, 2001

(65) Prior Publication Data

US 2002/0114168 A1 Aug. 22, 2002

Related U.S. Application Data

(60) Provisional application No. 60/249,182, filed on Nov. 15, 2000.

(51) Int. Cl.$^7$ .............................. F21V 7/04; H01L 33/00
(52) U.S. Cl. ........................ 362/555; 362/558; 362/560; 362/327
(58) Field of Search .................................. 362/551, 555, 362/558, 560, 227, 235, 243, 245, 246, 327, 511; 385/149, 901, 123; 359/618, 619, 621

(56) References Cited

U.S. PATENT DOCUMENTS

| | | |
|---|---|---|
| 1,153,446 A | 9/1915 | Roffy |
| 1,235,275 A | 7/1917 | Wood |
| 1,748,057 A | 2/1930 | Arbuckle |
| 1,998,967 A | 4/1935 | Raynolds |
| 2,120,836 A | 6/1938 | Grimes |
| 2,255,819 A | 9/1941 | Salani |
| 3,821,590 A | 6/1974 | Kosman et al. |
| 3,890,497 A | 6/1975 | Rush |

(List continued on next page.)

FOREIGN PATENT DOCUMENTS

| | | | |
|---|---|---|---|
| EP | 0 660 648 A1 | 6/1995 | |
| EP | 0 733 850 A2 | 9/1996 | |
| GB | 2131589 | 6/1984 | |
| JP | 62175702 A * | 8/1987 | ............ G02B/6/00 |
| JP | 63110403 A * | 5/1988 | ............ G02B/6/10 |
| WO | WO 87/04230 * | 7/1987 | ............ F21V/8/00 |
| WO | WO 98/21917 | 5/1998 | |
| WO | WO 98/26212 | 6/1998 | |
| WO | WO 99/06759 | 2/1999 | |
| WO | WO 00/54340 | 9/2000 | |

OTHER PUBLICATIONS

Arl Rabl et al., *Ideal concentrators for finite sources and restricted exit angles*, Applied Optics, vol. 15, No. 11, Nov. 1976, pp. 58–61.

D. Jenkins et al., *Integral design method for nonimaging concentrators*, J. Opt. Soc. Am. A, vol. 13, No. 10, Oct. 1996, pp 2106–2116.

D. Jenkins et al., *Tailored Reflectors for Illumination*, Applied Optics, vol. 35, No. 10, Apr. 1996, pp. 1669–1672.

(List continued on next page.)

*Primary Examiner*—Stephen Husar
*Assistant Examiner*—Sharon Payne
(74) *Attorney, Agent, or Firm*—Kirkpatrick & Lockhart LLP

(57) ABSTRACT

An illumination apparatus comprises an elongated waveguide having proximal and distal ends and a central longitudinal axis. The waveguide includes an elongated forward side for outputting light and an elongated rearward side having an elongated reflective surface for reflecting light towards the forward side. A light source such as a solid state light emitter may be situated on the proximal end of the waveguide introduces light into the waveguide in the form of a beam which propagates from the proximal end to the distal end. Light traveling within the waveguide is reflected from the reflective surface along the elongated rearward side towards the forward side for viewing.

15 Claims, 11 Drawing Sheets

U.S. PATENT DOCUMENTS

| | | | |
|---|---|---|---|
| 3,934,148 A | | 1/1976 | Collins |
| 3,957,351 A | | 5/1976 | Stockwell |
| 4,114,592 A | | 9/1978 | Winston |
| 4,128,332 A | | 12/1978 | Rowe |
| 4,130,107 A | | 12/1978 | Rabl et al. |
| 4,149,902 A | | 4/1979 | Mauer et al. |
| 4,210,954 A | | 7/1980 | Laser |
| 4,230,095 A | | 10/1980 | Winston |
| 4,237,332 A | | 12/1980 | Winston |
| 4,240,692 A | | 12/1980 | Winston |
| 4,254,453 A | | 3/1981 | Mouyard et al. |
| 4,262,206 A | | 4/1981 | Viehmann |
| 4,274,127 A | | 6/1981 | Beck et al. |
| 4,292,959 A | | 10/1981 | Coburn, Jr. |
| 4,320,442 A | | 3/1982 | McCamy |
| 4,359,265 A | | 11/1982 | Winston |
| 4,379,613 A | | 4/1983 | Coburn |
| 4,387,961 A | | 6/1983 | Winston |
| 4,392,750 A | | 7/1983 | Mettler |
| 4,422,135 A | | 12/1983 | McCamy |
| 4,492,778 A | | 1/1985 | Claussen et al. |
| 4,561,043 A | | 12/1985 | Thompson |
| 4,661,649 A | | 4/1987 | Reisfeld et al. |
| 4,733,332 A | | 3/1988 | Yamashita et al. |
| 4,739,152 A | | 4/1988 | Downs |
| 4,755,916 A | | 7/1988 | Collins |
| 4,865,417 A | * | 9/1989 | Naohiro et al. ............ 350/96.3 |
| 4,941,723 A | | 7/1990 | Sasada |
| 4,965,876 A | | 10/1990 | Földi et al. |
| 4,985,809 A | | 1/1991 | Matsui et al. |
| 5,040,098 A | | 8/1991 | Tanaka et al. |
| 5,095,099 A | | 3/1992 | Parkinson et al. |
| 5,128,846 A | | 7/1992 | Mills et al. |
| 5,184,114 A | | 2/1993 | Brown |
| 5,227,773 A | | 7/1993 | Wu et al. |
| 5,260,957 A | | 11/1993 | Hakimi et al. |
| 5,271,077 A | | 12/1993 | Brockman et al. |
| 5,321,417 A | | 6/1994 | Voelzke et al. |
| 5,332,910 A | | 7/1994 | Haraguchi et al. |
| 5,410,453 A | | 4/1995 | Ruskouski |
| 5,432,876 A | | 7/1995 | Appeldorn et al. |
| 5,481,637 A | | 1/1996 | Whitehead |
| 5,502,623 A | | 3/1996 | Brotz |
| 5,548,676 A | | 8/1996 | Savage, Jr. |
| 5,586,013 A | | 12/1996 | Winston et al. |
| 5,606,163 A | | 2/1997 | Huston et al. |
| 5,659,643 A | | 8/1997 | Appeldorn et al. |
| 5,677,972 A | | 10/1997 | Popovich |
| 5,678,913 A | | 10/1997 | Ishimaru et al. |
| 5,685,634 A | | 11/1997 | Mulligan |
| 5,704,708 A | | 1/1998 | Barson et al. |
| 5,709,453 A | | 1/1998 | Krent et al. |
| 5,721,795 A | | 2/1998 | Pelka |
| 5,757,557 A | | 5/1998 | Medvedev et al. |
| 5,779,351 A | | 7/1998 | Erickson et al. |
| 5,806,955 A | | 9/1998 | Parkyn, Jr. et al. |
| 5,813,753 A | | 9/1998 | Vriens et al. |
| 5,816,693 A | | 10/1998 | Winston et al. |
| 5,878,070 A | | 3/1999 | Ho et al. |
| 5,881,200 A | | 3/1999 | Burt |
| 5,924,788 A | | 7/1999 | Parkyn, Jr. |
| 5,949,581 A | | 9/1999 | Kurtenbach et al. |
| 5,980,063 A | * | 11/1999 | Ford et al. ............ 362/186 |
| 5,982,969 A | | 11/1999 | Sugiyama et al. |
| 5,997,155 A | | 12/1999 | Ducharme et al. |
| 6,005,707 A | | 12/1999 | Berggren et al. |
| 6,031,859 A | | 2/2000 | Nambu |
| 6,095,673 A | * | 8/2000 | Goto et al. ............ 362/582 |
| 6,103,006 A | | 8/2000 | DiPietro |
| 6,123,442 A | * | 9/2000 | Freier et al. ............ 362/559 |
| 6,257,737 B1 | | 7/2001 | Marshall et al. |
| 6,294,794 B1 | | 9/2001 | Yoshimura et al. |
| 6,422,712 B1 | * | 7/2002 | Nousiainen et al. ............ 362/31 |
| 2002/0127224 A1 | | 9/2002 | Chen |

OTHER PUBLICATIONS

David Rotman, *Quantom Dot Com, Technology Review*, Jan./Feb. 2000, pp. 50–57.

G.E. Jabbour et al., *Aluminum Composite Cathodes A new Method for the Fabrication of Efficient and Bright Organic Light–emitting Devices*, Optics & Photonics News, Apr. 1999, pp. 25–27.

Hewlett Packard catalog, Super Flux LEDs Technical Data, (date unknown), 3 pages.

I.M. Bassett et al., *The collection of diffuse light onto an extended absorber*, Reprinted from *Optical and Quantum Electronics*, vol. 10, 1978, 2 pages.

Jose L. Álvarez et al., Paper on *RXI concentrator for 1000X photovoltaic energy conversion*.

Juan C. Minano et al., Paper on *New non–imaging designs: The RX and the RXI concentrators*.

K. H. Schmidt et al., *Size quantization effects in InAs self–assembled quantum dots*, Appl. Phys. Letter, vol. 70, No. 13, Mar. 31, 1997, pp. 1727–1729.

Keith Barnham et al., *Quantum–dot concentrator and thermodynamic model for the global redshift*, Applied Physics Letter, vol. 76, No. 9, Feb. 28, 2000, pp. 1197–1199.

LumiLeds Product Showcase http:/www.lumileds.com/producs.html Oct. 11, 2000, 4 pages.

LumiLeds Red LED Rail Designer Kit, (date unknown), 5 pages.

N. C. Greenham et al., *Charge separation and transport in conjugated–polymer/semiconductor–nanocrystal composites studied by photoluminescence quenching and photoconductivity*, Physical Review B, vol. 54, No. 24, Dec. 15, 1996, pp. 17 628–17 637.

Olga I. Micic et al., *Highly efficient band–edge emission from InP quantum dots*, Appl. Phys. Letter, vol. 68 No. 22, May 27, 1996, pp. 3150–3152.

R. Winston, *Selected Papers in Nonimaging Optics*, SPIE, vol. MS106, 1995.

Slides on third party presentation at Monterey Conference, date unknown, 10 pages.

T. Tokizaki et al., *Linear and nonlinear optical properties of CdSe microcystallites in glasses*, Journal of Crystal Growth, vol. 117, Feb. 1992, pp. 603–607.

Tivoli escort lights, 1989O, 10 pages.

Tivoli the light fantastic, (date unknown), 4 pages.

U.S. patent application No. 09/334,848 filed Jun. 16, 1999.

U.S. patent application No. 09/620,051 filed Jul. 20, 2000.

U.S. patent application No. 09/800,067 filed Mar. 6, 2001.

U.S. patent application No. 09/800,073 filed Mar. 6, 2001.

U.S. patent application No. 09/948,507 filed Sep. 6, 2001.

U.S. patent application No. 09/993,286 filed Nov. 14, 2001.

U.S. patent application No. 10/199,991 filed Jul. 18, 2002.

W.T. Welford et al., *High Collection Nonimaging Optics*, Academic Press, 1989.

W.T. Welford et al., Paper on *The Optics of Nonimaging Concentrators Light and Solar Energy*, 1978, pp. 29–32.

William A. Parkyn, *Segmented illumination lenses for step–lighting and wall–washing*, (date unknown), 8 pages.

William A. Parkyn, *The design of illumination lenses via extrinsic differential geometry*, (date unknown), 9 pages.

\* cited by examiner

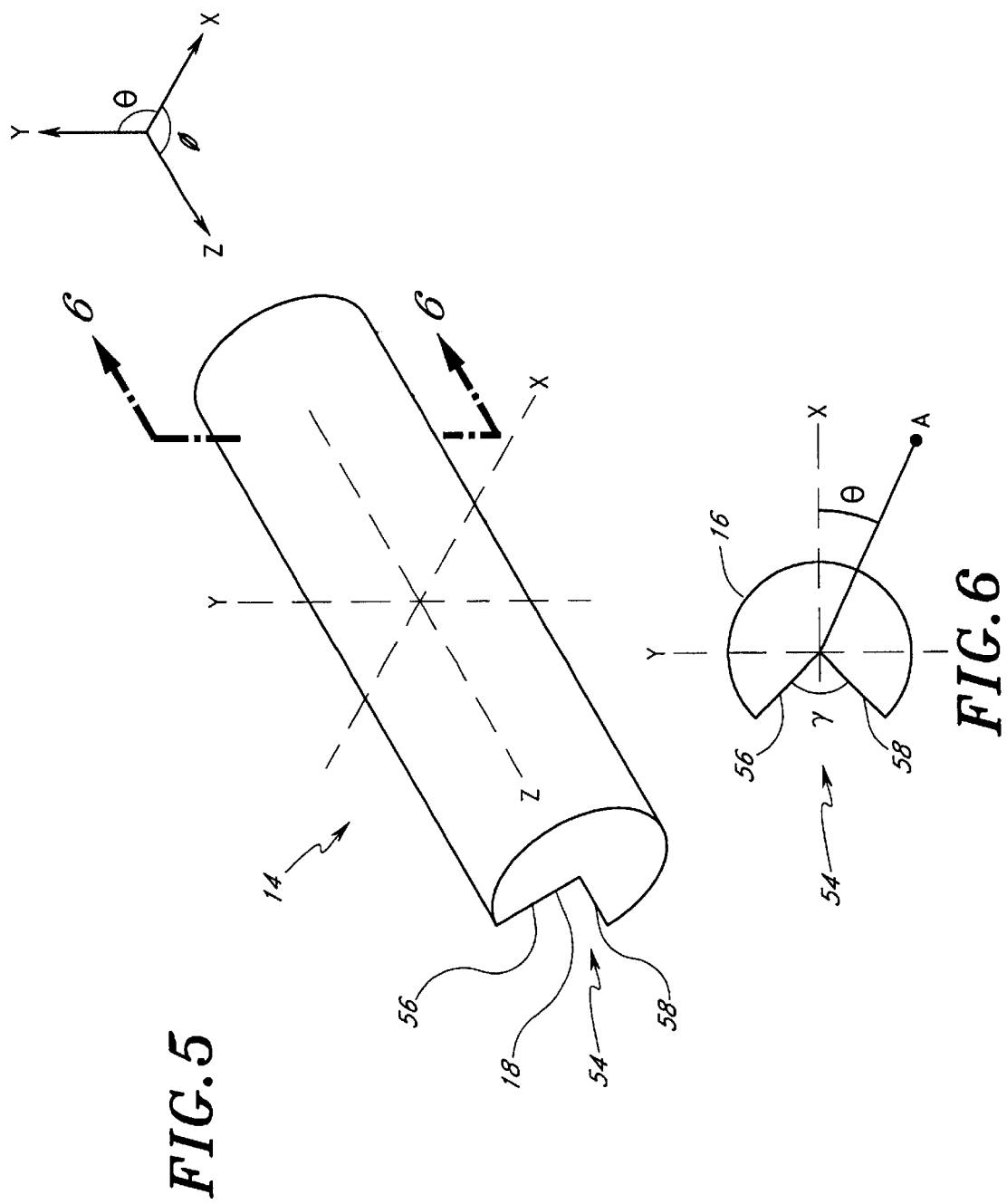

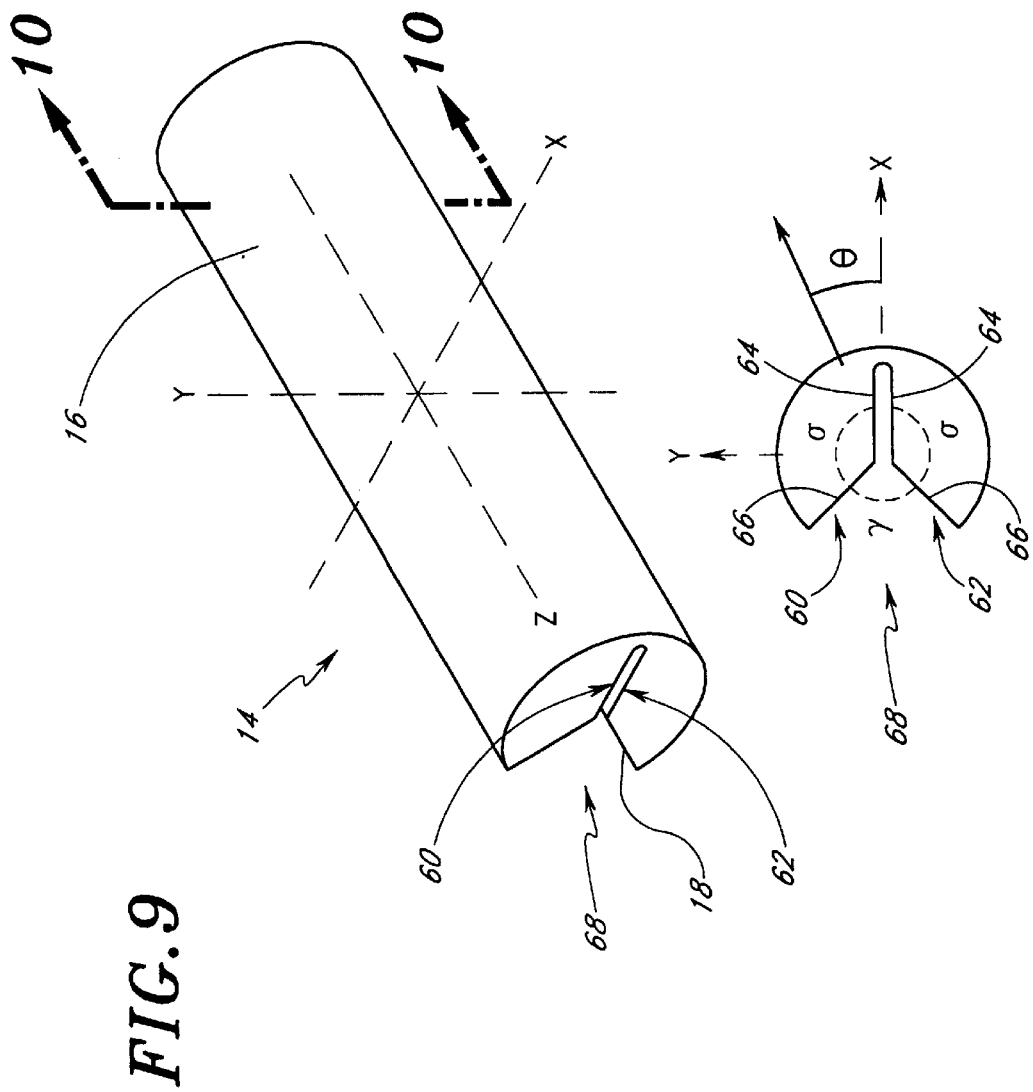

STRIP LIGHTING APPARATUS AND METHOD

PRIORITY APPLICATION

This application claims priority under 35 U.S.C. §119(e) from U.S. Provisional Patent Application Serial No. 60/249,182, filed Nov. 15, 2000 and entitled "Strip Lighting Apparatus and Method".

BACKGROUND OF THE INVENTION

The present invention relates to extended light sources, and more specifically, to light sources having a region that appears to a viewer to be substantially uniformly lit such as, for example, a replacement for a neon tube or chemiluminescent light stick.

To minimize rear-end collisions, automobiles are currently equipped with an additional brake light, known as a center high mounted stop light (CHMSL), which is mounted in the rear windshield. This additional brake light is situated at a location that is likely to be in the line of sight of a driver in a vehicle immediately behind. The position of this brake light is therefore thought to be more effective at alerting the driver in the vehicle that the automobile in front is slowing down than is the traditional location of the brake lights adjacent the taillights.

The CHMSL brake light typically includes one or more incandescent light bulbs contained within a plastic opaque casing with one side of the casing comprising a red translucent plastic diffuser. When the brakes are activated, the incandescent bulbs are energized and light passes through the red diffuser thereby producing a red glow from the brake light. This red glow, however, is generally not very uniform. Since illumination is provided by incandescent bulbs situated behind the diffuser, regions on the diffuser near the bulbs are brightly lit, while regions farthest from the bulbs are more dim, creating variation in intensity across the brake light. Additionally, the diffusers typically comprise plastic sheets having surfaces contoured to distribute the light emitted from the bulbs. When the brake light is activated, these contours are brightly visible. As a result, the illumination provided is hardly uniform, as variation in the brightness across the brake light, as well as detail on the diffuser, are visible. This lack of uniformity detracts from the aesthetic appeal of these brake lights. Brake lights that produce a glow with irregularities and variation in intensity across the light seem to be less appealing than lights with a uniform intensity distribution. Essentially, a uniform glow appears cleaner and smoother, an effect that is highly desirable in lighting applications. Aesthetic appearance is extremely critical in marketing and sales of automobiles because consumers' opinions of a vehicle are strongly influenced by its appearance. Consequently, car manufacturers are interested in improving the aesthetic appeal of their vehicles. If uniformly lit brake lights are aesthetically pleasing, then they will be more marketable. Thus what is needed is a light source having an extended region that appears to the viewer to be substantially uniformly lit.

SUMMARY OF THE INVENTION

In one aspect of the invention, an illumination apparatus comprises an elongated waveguide having proximal and distal ends and a central longitudinal axis. The waveguide comprises an elongated forward side for outputting light and an elongated rearward side for reflecting light towards the forward side. The rearward side includes an elongated reflective surface. A solid state light emitter is on the proximal end of the waveguide and introduces light into the waveguide in the form of a substantially collimated beam having a divergence angle α. The waveguide has a width at the distal end that is approximately equal to 2 L tan(α), where L is the length of the waveguide between the ends.

Another aspect of the invention also comprises an illumination apparatus comprising an elongated waveguide having proximal and distal ends and a central longitudinal axis. In addition, the waveguide comprises an elongated forward side for outputting light and an elongated rearward side for reflecting light towards the forward side. The rearward side includes an elongated reflective surface. A solid state light emitter is on the proximal end of the waveguide and introduces light into the waveguide. The distal end of the waveguide has a reflective surface which is non-perpendicular to the central axis of the waveguide.

Yet another aspect of the invention comprises an illumination apparatus comprising an elongate waveguide with a forward side for outputting light and a rearward side for reflecting light toward the forward side. The waveguide comprises first and second waveguide portions, each of the portions comprising an elongate concave transmissive output surface and an elongate reflective surface. The elongate waveguide portions are joined such that (i) the transmissive surfaces are in side-by-side relationship and such that (ii) the elongate reflective surfaces converge towards the forward side and flare outwardly toward the rearward side.

In still another aspect of the invention, an illumination apparatus comprising an elongated waveguide comprising an elongated forward side having a concave surface for outputting light and an elongated rearward side having a convex surface for reflecting light towards the forward side. The convex surface of the rearward side comprises an elongated reflective surface.

In yet another aspect of the invention, an illumination apparatus comprises an elongated waveguide comprising an elongated forward side for outputting light and an elongated rearward side for reflecting light towards the forward side; the rearward side comprises an elongated reflective surface. A non-imaging optical element on one end of the waveguide couples light from a light source into the waveguide. The non-imaging optical element provides an input aperture and an output aperture, wherein one of the apertures is larger than the other. The non-imaging optical element has sidewalls curved longitudinally between the input and output apertures such that the sidewalls couple light from the input aperture to the output aperture.

In still another aspect of the invention, an illumination apparatus comprises an elongated waveguide having a central longitudinal axis and a cross-section perpendicular to the longitudinal axis. The waveguide includes an elongated forward side having an elongate illumination surface for outputting light and an elongated rearward side for reflecting light towards the forward side. The rearward side comprises an elongated reflective surface. The waveguide is cross-sectionally shaped to function as a non-imaging optic for light propagating from the rearward side to the forward side.

BRIEF DESCRIPTION OF THE DRAWINGS

FIG. 5 shows a perspective view of the waveguide in another preferred lighting apparatus, wherein the rear surface comprises two planar sections tilted at an angle with respect to each other;

FIG. 6 is a cross-section of the lighting apparatus shown in FIG. 5 along the line 6—6;

FIGS. 9 and 10 are perspective and cross-sectional views of the waveguide in another preferred embodiment wherein the rear surface comprises two sections each comprising a forward and rearward planar facets;

DETAILED DESCRIPTION OF THE PREFERRED EMBODIMENT

Figure 1:
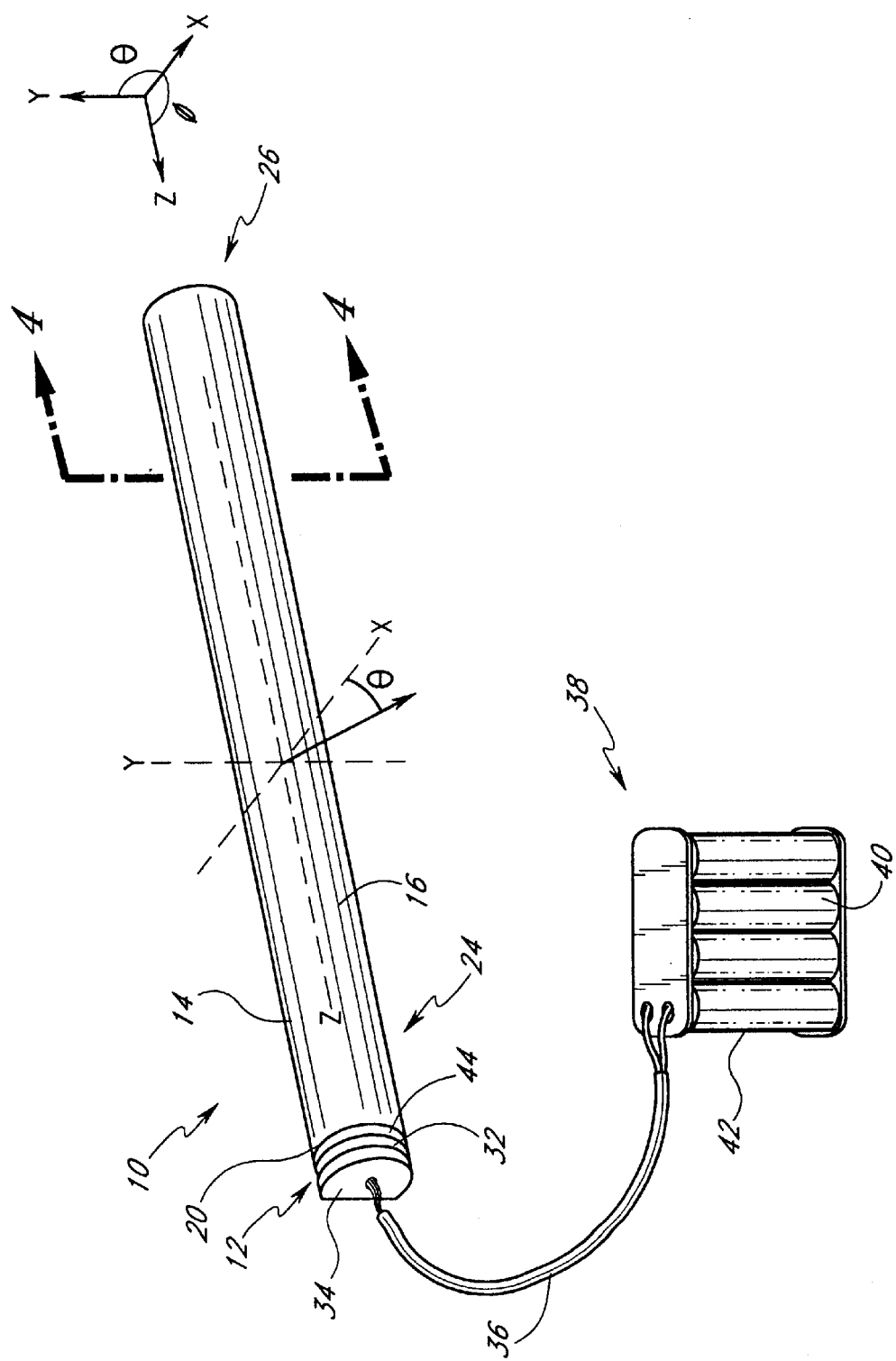
FIG. 1 depicts a perspective view of a preferred lighting apparatus of the present invention comprising a plurality of LEDs mounted on a printed circuit board, a plurality of collimating lenses, a waveguide, and a power supply.
Figure 2:
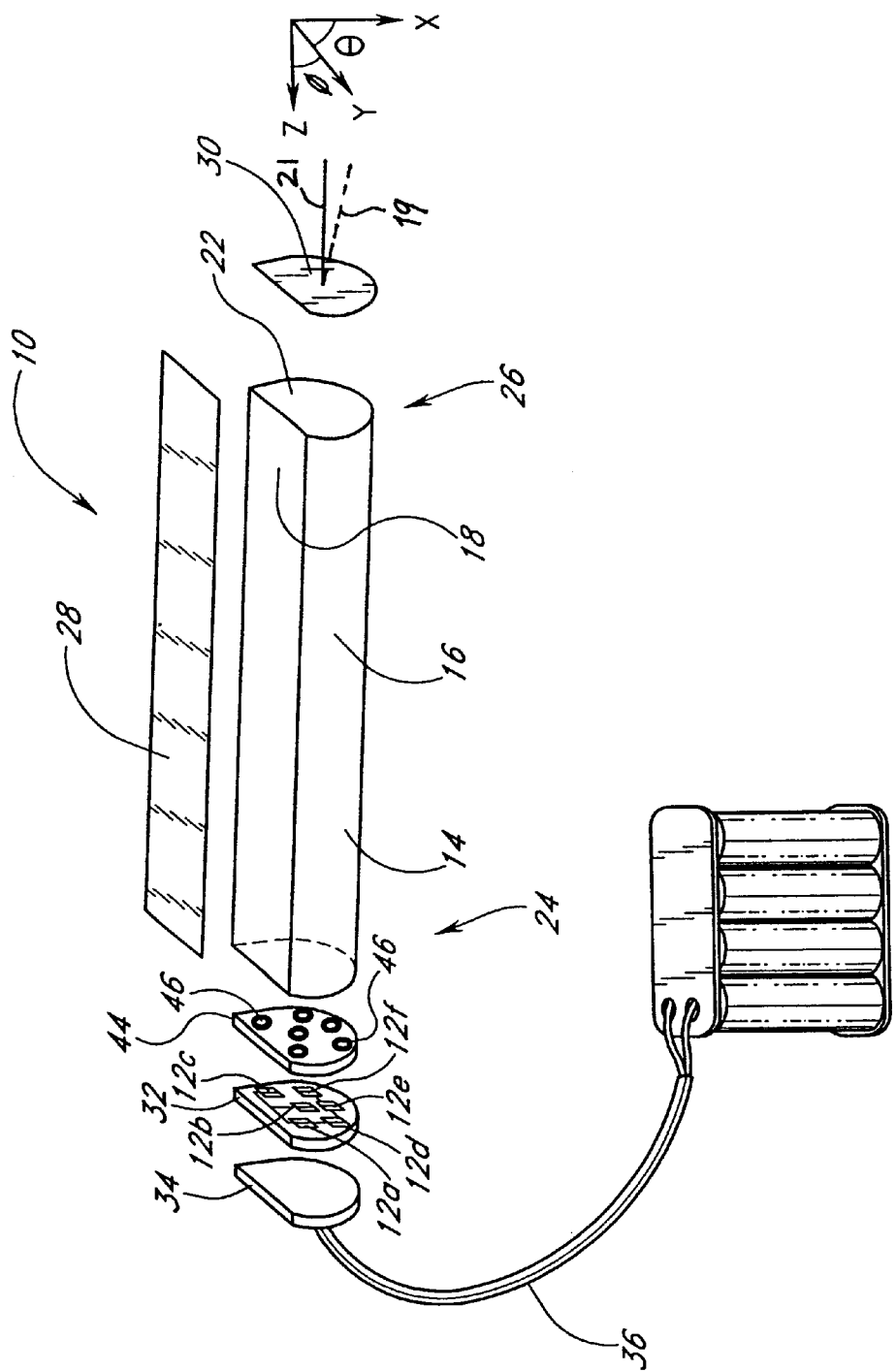
FIG. 2 is an exploded view of the lighting apparatus of FIG. 1 that shows the waveguide having a curved front surface, a roughened rear surface with a diffusely reflective layer formed thereon, and a side surface on a distal end of the waveguide having a specular reflective (or highly diffusely reflecting) layer adhered thereto.

As shown in FIGS. 1 and 2, a lighting apparatus 10 can be formed by attaching a plurality of light emitting diodes (LEDs) 12, here six 12a, 12b, 12c, 12d, 12e, and 12f to a waveguide 14 comprising a length of transparent material. The waveguide 14 may comprise, e.g., plastic, glass, or any material that is transparent to light emitted by the LEDs 12. Example materials that may be employed to fabricate the waveguide 14 include acrylic, polycarbonate, and silicone. The waveguide 14 shown is rod-shaped, i.e., substantially longer than it is thick or wide. The rod-shaped waveguide 14 may range between about 4 inches to about 4 or 8 feet long and between about ¼ inch to about 2 inches thick or may be outside these ranges. This waveguide 14 may be rigid, if for example, it comprises acrylic or may be flexible, if it comprises, for example, silicone.

The waveguide 14 has a front and a rear with a corresponding front face or forward illumination surface 16 and a rear reflective surface 18 as well as an input side surface 20 and a reflective side surface 22 on two ends 24 and 26 respectively of the waveguide. The front face 16 is curved while the rear surface 18, the input side surface 20 and the reflective side surface 22 are substantially planar. This waveguide 14 can be formed from a cylindrically-shaped rod having a curved outer surface, by cutting off or milling away a portion of the rod, thereby forming a flat face. Any number of other techniques, such as extruding, molding, and casting, as are well known in the art, as well as those yet to be devised, may also be employed to form the waveguide 14.

Figure 4:
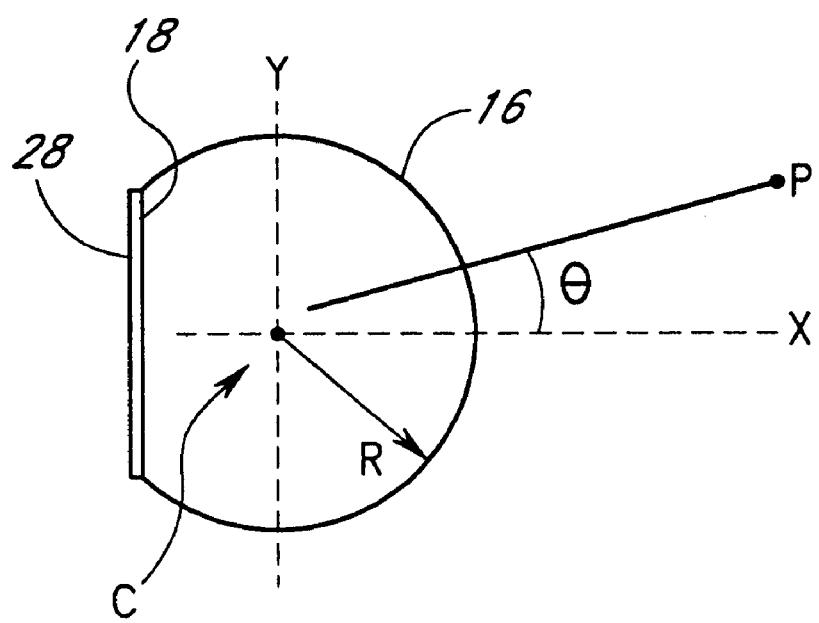
FIG. 4 depicts a cross-sectional view of the lighting apparatus of FIGS. 1–3, along the lines 4—4 shown in FIG. 3.

The front face 16 of the waveguide 14 is preferably substantially smooth such that a minimal amount of light is scattered therefrom and light is internally reflected in a specular manner. The front face 16 is curved along one direction, herein denoted Y, but is substantially devoid of curvature in another perpendicular direction, Z, that extends longitudinally across the length of the waveguide 14. As shown by the drawing of the cross-section of the waveguide 14 depicted in FIG. 4, the front face 16 preferably is concave as seen from within the waveguide; light propagating within the waveguide incident on the front face 16 is reflected by or transmitted through a concave surface. In particular, the front face 16 shown has a circular curvature defined by a center of curvature C and a radius, R. This radius of curvature is preferably in the range between about 0.25 inch to about 1.5 inches depending on the width and thickness of the waveguide 14 but is not limited to this range. This curvature may also be aspheric so as to provide a predetermined beam profile for light exiting the front face 16. The aspheric shape may be specifically tailored to control the extent of divergence of light output from the waveguide 14.

The rear surface 18 comprises a portion of the surface of the waveguide 14, the extent of which relates to a characteristic of the waveguide, its vertical field-of-view ($\pm\theta$), which is discussed more fully below. For example, for a waveguide 14 formed from a right circular cylinder that is 1 inch in diameter and 15 inches in length, a rear surface 18 that is about ¾ inch wide by about 15 inches long would provide more than a $\pm 90°$ vertical field-of-view, while a rear surface about 0.1 inch wide by about 15 inches long would provide a vertical field-of-view of $\pm 10°$. This rear surface preferably is roughened to promote light scattering. Adhered to the rear surface 18 is a reflective layer 28 such as a layer of reflective tape, and more particularly, diffusely reflective tape. The reflective tape is preferably highly reflective. One suitable example of diffusely reflective white tape available from the commercial graphics division of 3M, St. Paul, Minn., for example, has a reflectivity of greater than about 95%. Alternatively, the rear surface 18 may be smooth and a diffusely reflective specular material may be adhered to the rear surface. Material such as Radiant Light Film VM 2000 from 3M, with reflectivity in excess of 99%, is preferred.

Returning to FIG. 2, the side surfaces 20 and 22 preferably are smooth and may even be polished. The input side surface 20 is proximal to the plurality of LEDs 12. Accordingly, the end of the waveguide 14 with the input side surface 20 is designated herein as the proximal end 24, the opposite end 26 distal from the plurality of LEDs 12 being designated the distal end. The input side surface 20 is preferably oriented perpendicular to the length of the waveguide 14 along a longitudinal axis that extends longwise in the Z direction. Accordingly, this input side surface 20 is substantially parallel to both the X and Y directions shown in FIGS. 1 and 2. The reflective side surface 22 located on the distal end 26 of the waveguide 14, may also be oriented substantially perpendicular to the length of the waveguide and to the longitudinal axis Z, and therefore substantially parallel to the X and Y directions. More preferably, however, this planar reflective side surface 22 is slightly tilted toward the rear surface 18 such that a normal 19 through the planar reflective side surface is angled with respect to the Z axis 21 and the length of the waveguide 14. The amount of tilt may be as high as 10° or 20°, but preferably depends on the length and width of the waveguide 14 and thus may be larger or smaller. In particular, the reflective surface 22 is preferably tilted an amount about equal to a, which is defined in FIG. 3 and is discussed more filly below. Also, this reflective side surface 22 preferably is substantially specularly reflective. To provide reflectivity, a specularly reflective layer 30 comprising, e.g., a reflective film or foil, can be placed on this side 15 surface 22. Silver reflective tape, available from 3M under the trade name Radiant Light Film VM 2000, is particularly effective, as it provides 99% reflectivity and is specularly reflective.

Still referring to FIG. 2, the light emitting diodes (LEDs) 12 are positioned adjacent the input side surface 20. More specifically, the LEDs (light emitting diodes) 12 are mounted on a printed circuit board 32 that is secured to a rigid structural support 34 adjacent the planar input side surface 20. Transparent-substrate AlInGaP LEDs available from LumiLeds, or InGaN LEDs available from Nichia Corp., are examples of light emitting diodes 12 suitable for producing illumination in the waveguide 14. The lighting apparatus 10, however, may employ other types of light sources. For example, phosphorous or fluorescent sources, superluminescent light emitting diodes, and laser diodes and other optical sources not listed herein, separate or in arrays, may be suitably employed. The light source may be one or many. Preferably, however, the lighting apparatus 10 includes as a light source between about 1 to 40 light emitting diodes 12. The output wavelength of the light source is not restricted. For lighting applications, visible wavelength is preferable, but, if used, e.g., in conjunction with fluorescent emitters in the waveguide 14 and possibly at the reflective side surface 22 or at the rear surface 18, the wavelengths will not be so limited. The power output from the light sources is also not restricted, and will depend in part on the size of the waveguide 14 and/or the application. If the power required is large, however, heat sinks may be necessary to avoid overheating the light sources. The plurality of LEDs 12 are electrically connected through a wire 36 to a power supply 38, which may comprise a set of batteries 40 contained in a package 42. Alternate arrangements for providing power to LEDs 12 or other light sources, such as DC and AC power supplies, may alternatively be employed.

A collimating optical element 44 is sandwiched between the LEDs 12 and the input side surface 20. This collimating optical element 44 preferably comprises one or more collimators 46. These collimators 46 may comprise imaging optics as well as non-imaging optics. In particular, these collimators 46 may comprise conventional lenses having convex or concave spherical or aspheric surfaces, Fresnel lenses, or any other optics capable of transforming the light output from the LEDs 12 into a collimated beam. Preferably, however, the collimating optical element 44 comprises one or more TIR or total-internal-reflection lens as is disclosed in U.S. Pat. No. 5,806,955 entitled "TIR Lens For Waveguide Injection" issued to Parkyn, which is incorporated herein by reference. As shown in FIG. 2, each of the LEDs 12 may have a separate collimating lens 46 adjacent thereto, but alternatively a single lens can be associated with two or more closely spaced LEDs 12, so long as a substantially collimated beam results. The collimating lenses 46 preferably ranges in size from, e.g., about 0.2 inch to about 2 inches (5.0 to 50.8 mm) in diameter but is not limited to this range. These collimating lenses 46 may comprise glass but preferably comprise plastic or other polymer-based materials that are transparent to the light output by the light emitting diodes 12. These collimating lenses 46 are preferably shaped by molding, but may be formed in any manner that yields a collimating lens of sufficient optical quality. Although the waveguide 14 and collimating lenses 46 are shown as separate components in FIG. 2, the lenses can be integral with the waveguide, for example, by providing the input surface 20 of the waveguide with contours that produce one or more total internal reflection (TIR) lenses. Shaping the input surface 20 to include such lenses is especially practical if the waveguide 14 is formed by molding.

By employing the collimating optical element 44, the lighting apparatus 10 radiates substantially uniformly across its length. More particularly, when the plurality of LED's 12 are energized with electrical power from the power supply 38, they will emit light, which is coupled into the rod-shaped waveguide 14 via the collimating lenses 46. Light radiating from an unpackaged LED (i.e., a die with no optics) is substantially divergent. An LED may, for example, produces a beam of light having an angular distribution ranging from about ±90° for a bare LED die to about ±15 degrees angular spread for a bullet-lens type of packaged LED. Thus, without the collimating optical element 44, light coupled into the waveguide 14 will also be substantially uncollimated, resulting in high brightness at the proximal end and less elsewhere. The collimating element 44, however, receives the divergent light emanating from the LED 12 and collimates it. Accordingly, light coupled into the waveguide 14 is therefore substantially collimated.

Waveguides, like the waveguide 14 in the lighting apparatus 10 shown in FIGS. 1 and 2, have numerical apertures that define the angle in which light can be coupled into and guided through the waveguide. This angle is determined by the composition and index of refraction of the waveguide 14 and the surrounding medium, if the waveguide includes no cladding. Alternatively, the waveguide 14 may comprise a core region and a cladding (not shown), the composition of which determines the numerical aperture. In particular, the compositions determine the critical angle of total internal reflection (TIR), i.e., rays of light within this range of angles experience total internal reflection within the waveguide 14, and are consequently guided therethrough with virtually no losses. Preferably, the collimator 46 has a numerical aperture that matches or is smaller than that of the waveguide 14, such that substantially all the light from the light source is coupled into the waveguide and most preferably into low-order TIR modes. The numerical angle may for example correspond to a coupling angle, between about ±5° to ±30° as measured outside the waveguide 14 or may be outside this range.

Figure 3:
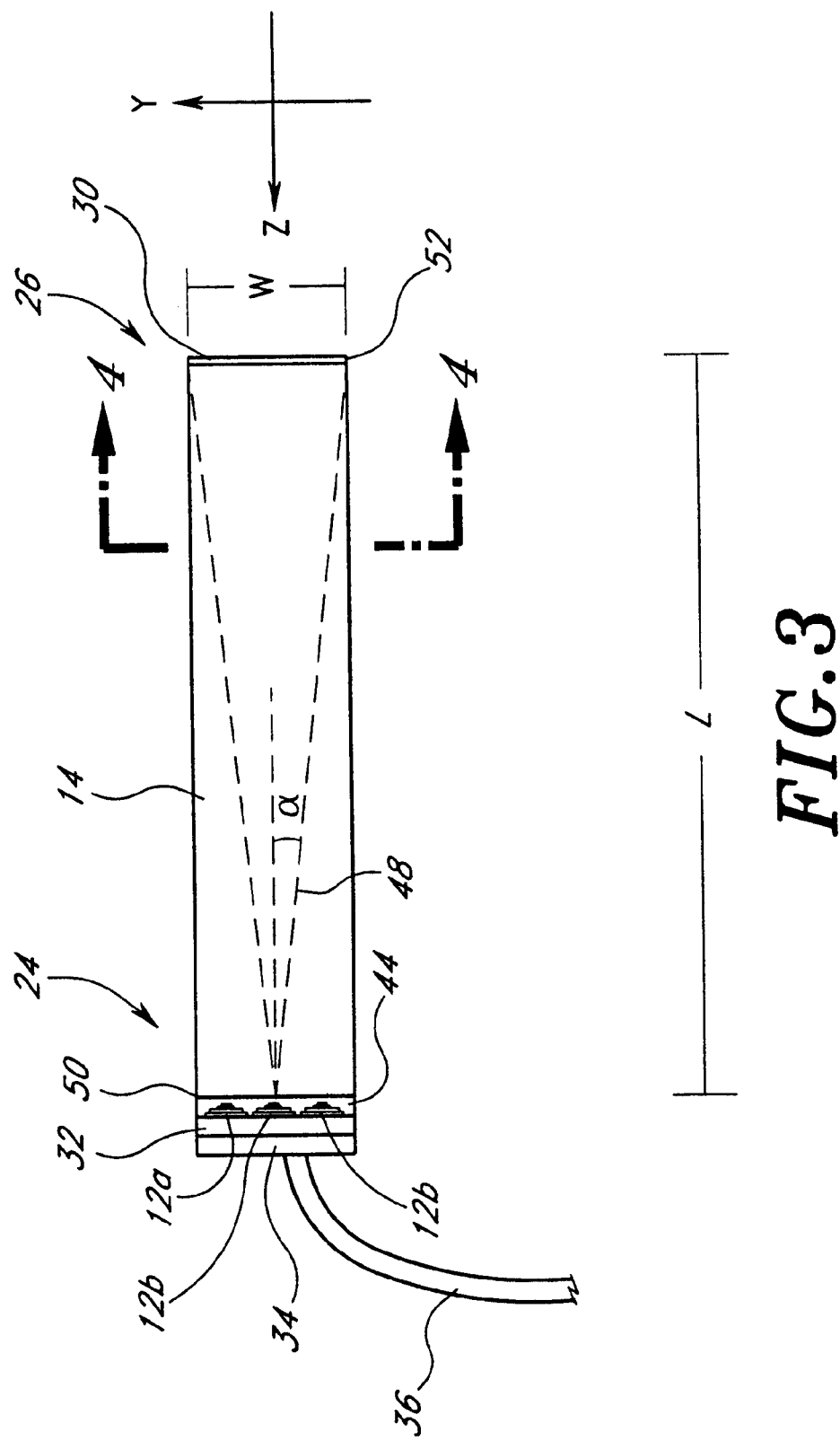
FIG. 3 shows a front view of the lighting apparatus shown in FIGS. 1 and 2.

As shown in FIG. 3, the preferable extent of collimation required also depends upon the aspect ratio, i.e., the ratio of length to width, of the waveguide 14. A longer and more narrow waveguide 14, requires a more collimated or less divergent beam to achieve good uniformity over the length of the lighting apparatus 10. A general guide for determining the suitable level of collimation is provided by a line 48 that extends from a point centered on the surface 20 on the proximal end 24 of the waveguide 14 to a point 52 on an edge of the reflective surface 22 at the distal end 26. This line 48 forms an angle α with respect to the longitudinal or Z axis. This angle α has a value determined by the inverse tangent of the ratio of half the width of the waveguide 14 to its length, i.e., $$\alpha = \arctan\left(\frac{w}{2l}\right) \quad \text{(Equation 1)}$$

where w is the width and l is the length of the waveguide. Preferably, this angle α corresponds to the one-half intensity cutoff of the optical beam emanating from the light source 12 and propagating down the waveguide 14. The collimating optical element 44 collimates the light emitted by the plurality of LEDs 12 such that at least about half the light from the LEDs propagates through the waveguide 14 toward the reflective side surface 22 at an angle no more than about α with respect to the length of the waveguide or similarly the Z axis, as defined by Equation 1. Note that the cross-section of the waveguide 14 perpendicular to the longitudinal axis (Z) may be asymmetric. In such cases, the width, w, may correspond to the smallest width across the cross-section.

The light emitted by the plurality of LEDs 12 is guided through the waveguide 14 from the input side surface 20 and toward the reflective side surface 22. A portion of the light emitted from the LEDs 12 travels directly to the reflective side surface 22. Another portion of the light will be specularly reflected from the front face 16 toward the reflective side surface 22. This specular reflection results from total internal reflection. A separate portion of the light emanating from the LEDs 12, however, is directed to the rear surface 18. Since the rear surface 18 is diffusely reflective, light incident thereon will be reflected or scattered in all directions. Accordingly, some of the light reflected from the rear surface 18 will be scattered toward the front face 16 at an angle with respect to the normal to the front surface that is greater than the critical angle, and some of the light reflected from the diffusely reflective rear surface 18 will be scattered toward the front face 16 at an angle that is less than the critical angle. The light scattered at an angle that is greater than the critical angle will be totally internally reflected by the front face 16. In contrast, the light scattered at an angle less than the critical angle will not experience total internal reflection at the front face 16, but will pass through the front surface and exit the waveguide 14. In this manner, a portion of the light incident on the diffusely reflective rear surface 18 emanates from the front surface 16 of the waveguide 14, causing the waveguide to provide illumination from its front surface.

Light that does not exit the front face 16 continues to propagate within the waveguide 14. For example, light scattered from the rear surface 18 toward the front face 16 at an angle greater than the critical angle will be reflected from the front surface. This light will likely be reflected back to the rear surface 18, to be diffusely reflected again. As before, some of the diffusely reflected light will be scattered from the rear surface 18 toward the front surface 16 at angles less than the critical angle, such that this light is not totally internally reflected but is transmitted through the front surface. This light further contributes to the illumination output by the waveguide 14. Some of the light, however, is incident on the front face 16 at an angle greater than the critical angle and is reflected therefrom, since the waveguide 14 comprises a material having an index of refraction that is larger than that of the surrounding medium, which may, for example, be air. This light remains within the waveguide 14, being reflected from the front, rear and side surfaces 16, 18, 20 and 22 until it scatters from the rear surface at an angle sufficiently small in comparison to the critical angle as measured with respect to the normal to the front face to permit its escape through the front face.

As discussed above, preferably the rear surface 18 is rough, as from sanding or by incorporating certain scattering microstructures therein. Preferably, the rear surface 18 is uniformly rough so as to prevent uneven scattering, which may lead to uneven distribution of light scattered from the waveguide 14. Additionally, the rear surface 18 may comprise a diffusely reflected layer formed thereon to promote reflection. Again, the layer is preferably diffusely reflective to cause a portion of the light reflected therefrom to be directed toward the front face 16 at angles conducive to transmission through the front face and not conducive to total internal reflection.

Also, the side surface 22 on the distal end 26 of the waveguide 14 opposite the plurality of LEDs 12 is reflective. Consequently, light propagating from the LEDs 12 through the length of the waveguide 14 is reflected from this reflective side surface 22 back toward the input side surface 20. The reflective side surface 22 is preferably specularly reflective so that the beam collimated by the collimating optical elements 44 remains collimated upon reflection from the reflective side surface. This reflective side surface 22, may however, be diffusely reflective. The reflective side surface 22 may, e.g., include a layer of diffusely reflective white tape that reflects over 95% of the light. Additionally, the reflective side surface 22 may be contoured to shape the beam reflected therefrom. For example, the reflective side surface 22 may comprise a specular mirror having an incline tilted with respect to the longitudinal Z axis at an angle of approximately α and may be helical, or have other nonplanar shapes so as to break any symmetry of skew rays. Skew rays, rays of light not in a plane containing the centerline or Z-axis, are in the majority, and for symmetric waveguides these skew rays may elude ejection from the guide.

Since the light propagating through the waveguide 14 is substantially collimated, then a substantially constant amount of light is incident on each portion of the rear surface 18. One reason for this uniform distribution is that the distal reflecting surface 22 effectively acts like a separate light source, providing one on each end 24, 26 of the waveguide 14. If, instead of being collimated, the beam within the waveguide 14 is substantially divergent or convergent, the beam will be reflected from the front face 16 and rear surface 18 a plurality of times before traversing the length of the waveguide 14 once. A significant portion of the light therefore would be scattered from the diffusely reflective rear surface 18 and escape the front face 16 of the waveguide 14 prior to reaching the distal end 26 of the waveguide. Consequently, the beam will have a significantly reduced intensity over a substantial portion of the waveguide 14. Achieving uniform illumination from the waveguide 14 is hindered as the amount of light escaping from the waveguide 14 near the LEDs 12 will be substantially larger than the amount of light escaping from the waveguide at the distal end 26 of the waveguide, far from the LEDs. By providing a more collimated beam, however, light is more uniformly distributed through the waveguide 14 and more particularly, an equal distribution of rays of light emanating from the LEDs 12 are incident on the rear surface 18, to scatter therefrom. Accordingly, the rear surface 18 appears uniformly illuminated, because each portion of the rear surface receives and scatters an approximately equal amount of light. The appropriate amount of collimation is therefore that amount which provides for substantially uniform illumination of the rear surface 18 and which thereby produces substantially uniform scattering from a substantial entirety of the rear surface. Moreover, the appropriate amount of collimation is that amount which provides a substantially uniform distribution of light escaping the front face 16. In particular, variation in light emitted from different portions of the front face 18 is preferably limited to less than, for example, 50 percent or more preferably less than 20 to 30 percent. Variation in intensity of more than 50 percent would be detectable by an eye of some observers gazing at the lighting apparatus 10 and observing the rear surface 18 through the front face 16. Without collimating the light coupled into the waveguide 14, uniformity in intensity emitted by the lighting apparatus 10 is difficult to provide. In particular, insufficient collimation will cause the beam to be substantially attenuated toward the distal end 26 of the waveguide 14. The beam, for example, may be halved or may be noticeably darker to the viewer, or practically extinguished before traveling one half or one third of the length of the waveguide 14.

The specular layer 30 on the reflective side surface 22 enhances uniform illumination of the rear surface 18 by providing for multiple passes of the beam through the length of the waveguide 14. Even by providing substantial collimation, the beam will be slightly attenuated after one pass from the proximal 24 to the distal end 28 of the waveguide 14. Consequently, after one pass, the amount of light escaping from the distal end 28 will be less than that emitted from the proximal end 26. Moreover, upon a second pass, light returning to the proximal end 26 will be further diminished. Emission from the proximal end 24 on the second pass will therefore be less in comparison with emission from the distal end 24. The aggregate affect of two passes, i.e., one complete round-trip, therefore is substantially uniform scattering across the length of the waveguide 14. So, after multiple passes, a substantially equal amount of light is emitted from each portion of the rear surface 18. Accordingly, collimation and specular reflection from the reflective side surface 22 enable multiple passes of the beam and thereby facilitate illumination from the waveguide 14 that is substantially constant across its length.

Preferably, however, the reflective side surface 22 is not oriented perpendicular to the length of the waveguide 14 and similarly to the longitudinal, Z, axis but instead is tilted somewhat. As discussed above, for example, the reflective side surface 22 is angled, preferably toward the substantially rear surface 18 by an amount between about a and 3α, wherein a is determined by the dimensions of the waveguide as illustrated by FIG. 3. The distal reflective side surface 22 may alternatively be oriented at steeper or shallower angles. The reflective side surface 22 can be tilted toward the front surface as well. Tilting the reflective side surface 22 promotes scattering of the beam from the rear surface 18 by steering the beam toward the rear surface either directly or upon reflection from the front surface 16. Thus, tilting the reflective surface 22 causes the rays of light to exit the front face 16 sooner. In contrast, with more passes, more light is disadvantageously absorbed or scattered in the waveguide material. Introducing tilt in the reflective side surface 22, therefore, causes a brighter output to result as fewer passes through the waveguide 14 are required before the light escapes from the front surface 22. By restricting the number of passes, the amount of absorption is reduced and a more intense optical output is extracted from the waveguide 14. Also tilting the reflective side surface 22 minimizes the amount of light returning to the plurality of LED's 12, which are strong absorbers of light returning to them. Thus, by outputting the light from the lighting apparatus 10 prior to the beam reaching the plurality of LED's 12, the apparatus is more efficient, i.e., much less light is lost to the LED's upon reflection from the distal end 26.

The shape of the front surface 16 affects the optical characteristics of the lighting apparatus 10. In particular, the curvature of the substantially curved front surface 16 creates a lensing effect that causes the rear surface 18 to be imaged with magnification. The waveguide 14 shown in FIGS. 1, 2, and 4 comprises a plano-convex cylindrical lens, the substantially planar rear surface 18 and the curved front face 16 corresponding respectively to the plano and convex surfaces. This forward surface 16 is convex as seen from outside of the waveguide as is typical for conventional lens nomenclature. This surface, however, is concave when viewed from within the waveguide, which is the convention generally used herein. Like a lens, the waveguide 14 is capable of imaging. In particular, an object adjacent to the piano surface, i.e., the planar rear surface 18, is magnified by the curved front face 16. Accordingly, the planar rear surface 18, being diffusely reflective is imaged and magnified by the curved front face 16 of the waveguide 14. The image of the planar rear surface 18, however, is only visible from a range of angles, which define a field-of-view for the lighting apparatus 10. Since light from the LEDs 12 is scattered off the rear surface 18, the image of the rear surface visible through the front face 16 determines the projection of light from the waveguide 14. The waveguide 14, therefore, only radiates within the narrow range of angles corresponding to the field-of-view of the lighting apparatus 10. This field-of-view is wider in the XZ plane than it is in the XY plane, wherein $\phi$ and $\theta$ correspond to angles in the XZ and XY planes as measured from the X axis shown in FIGS. 1–4. The field-of-view in the XZ and XY planes are likewise denoted $\phi_{FOV}$ and $\theta_{FOV}$. The field-of-view $\phi$FOV may range, for example, between about ±60° to ±90° while the field-of-view $\theta_{FOV}$ may range between about ±30° and ±60°. In other embodiments, the field-of-view may be larger or smaller. Outside the field-of-view, the rear surface 18 is not visible through the front surface 16 and thus, outside those angles illumination is not delivered by the lighting apparatus 10. In contrast, for each viewing direction within the field-of-view, some illumination from the plurality of LEDs 12 is visible through the front surface 16, but at some angles only a portion of the illuminated rear surface 18 is visible. The largest angle in which the total or entire width of the planar rear surface 18 is visible is denoted $\theta_{TOTAL}$. In some embodiments, this angle, $\theta_{TOTAL}$, may range from about ±10° to ±45° but may also be larger or smaller.

The field-of-view $\theta_{FOV}$ can be improved by providing a rear surface 18 having a shape other than a single plane, as shown in FIG. 5 and 6. In particular, the field-of-view is increased by forming an indentation 54 the length of material comprising the waveguide 14, thereby creating the rear surface 18. This rear surface 18 is therefore convex as seen from within the waveguide. Light propagating within the waveguide reflects off of a generally convex surface. In particular, the rear reflective surface 18 is generally convex as viewed from the cross-section perpendicular to the longitudinal axis (Z) of the waveguide. As discussed above, this rear surface 18 is visible through the front face 16.

The convex rear surface 18 may have planar sides. The rear surface 18, for example, may comprise two planar sections 56 and 58 tilted at an angle γ with respect to each other. The waveguide 14 is otherwise as described above and operates similarly. Light coupled in through a collimating optical element 44 propagates through the length of the waveguide 14 and is reflected from the reflective side surface 22 at the distal end 26 of the guide. During propagation, rays may reflect off the front face 16 and the rear surface 18, the latter which is diffusely reflecting. Some of the rays of light emitted by the plurality of LEDs 12 may scatter off the rear surface 18 and are directed toward the front face 16 at angles conducive to their escape from the waveguide 14. These rays, being transmitted through the front face 16 contribute to the illumination produced by the lighting apparatus 10.

The field-of-view of this lighting apparatus 10 is improved as the two sections 56 and 58 of the rear surface 18 are visible through a greater range of viewing angles in comparison to a like waveguide 14 with a single planar rear surface. When viewing the waveguide 14 from a point on the XZ plane, the planar sections 56 and 58 of the rear surface 18 for the waveguide shown in FIGS. 5 and 6 are equally visible. By viewing the waveguide 14 from a point off the XZ plane, such as from the point A shown in FIG. 6, more of one of the sections 56, the upper section, is visible while less of the other section 58, the lower section, is visible. By moving farther from the XZ plane, i.e., increasing the viewing angle θ, for example, below the XZ plane, less of the upper section 56 is visible but more of the lower section 58 is visible. At some viewing angle θ, the entire upper section 56 is beyond view. At an even larger viewing angle θ, particularly at the angle that defines the field-of-view, $\theta_{FOV}$, even the lower section 58 is beyond sight. The field-of-view of the light apparatus 10 shown in FIGS. 5 and 6 depends on the angular separation y between the two planar section 56 and 58. In addition to improving the field-of-view, the indention creates a region of space that can be employed for storing components integral to the lighting apparatus 10, such as for example batteries 40 that power the plurality of LEDs 12.

The field-of-view of the light apparatus 10 can be further increased by increasing the number of planar sections 56 and 58 comprising the rear surface 18. The rear surface 18, may for example, include 3, 4, 5, or more planar surfaces, each separated from adjacent sections by same or different angles. These sections, however, are not limited to being planar. These sections may, for example, be curved or otherwise shaped to improve the field-of-view and provide a large surface area for the rear surface 18 that is visible through the front surface 16. These sections may come together to produces convex reflective surface for light propagating within the waveguide.

Figure 7:
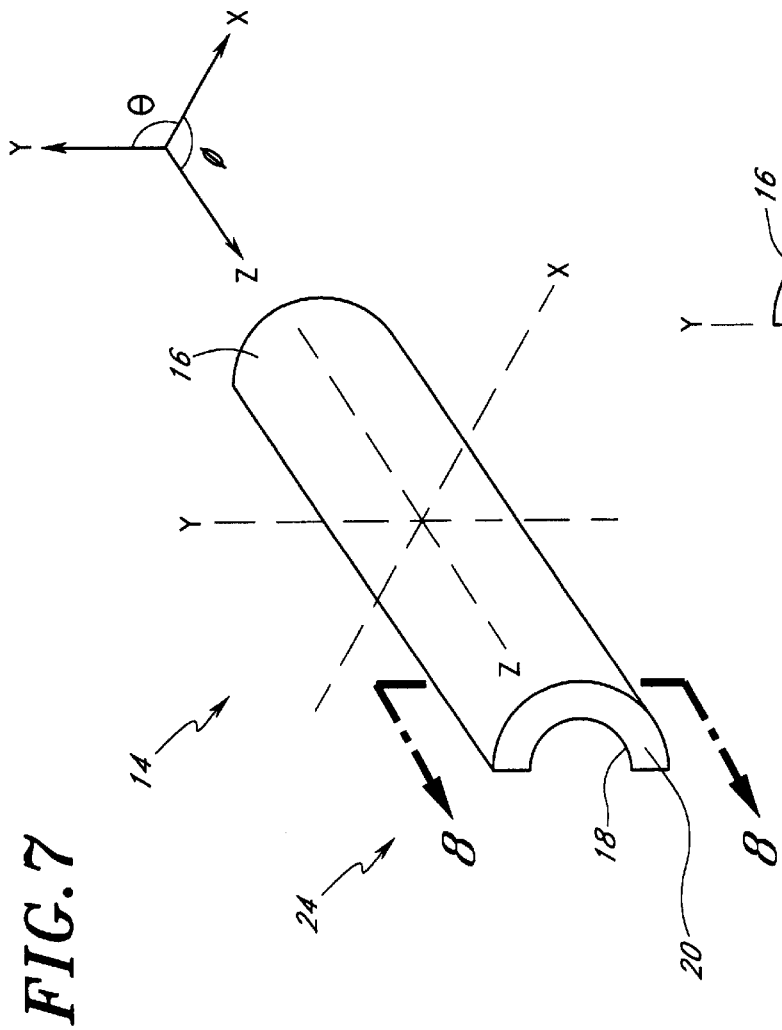
FIG. 7 depicts perspective view of the waveguide in another preferred lighting apparatus wherein the rear surface comprises a curved surface having a circular curvature.
Figure 8:
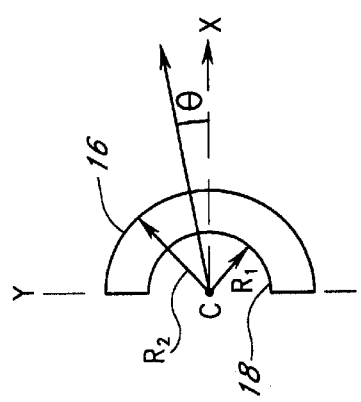
FIG. 8 is a cross-section of the lighting apparatus shown in FIG. 7 along the line 8—8.

As shown in FIGS. 7 and 8, the rear surface 18 may comprise a single curved surface which scatters the light emitted from the plurality of LEDs 12. This curved surface 18 is a convex surface as seen from within the waveguide and has circular curvature defined by a radius of curvature, $R_1$, and a center of curvature C, as depicted in the cross-sectional view of FIGS. 7 and 8. In contrast, the curved front face 16 has a radius of curvature $R_2$ with C as the center of curvature. Accordingly, the two surfaces 16 and 18 are concentric. The center of curvature C corresponds to both the center of curvature for the circular curvature of the rear surface 18 as well as the curvature for the front face 16. Since the waveguide 14 is shaped like a rod or a cylindrical lens, the curvature of the front face 16 and the rear surface 18 is more aptly said to be coaxial, i.e., having a same axis that defines the curvature of the two surfaces 14, 16. Nevertheless, by employing a circular curvature, the field-of-view in the XY plane, $\theta_{FOV}$, is substantially increased. In particular, the field-of-view is increased to about ±90°; illumination being emitted from the lighting apparatus 10 in this range of angles. Also, employing a single curved surface as the rear surface 18, eliminates seams or corners that create distracting features in the rear surface that are visible when viewing the lighting apparatus 10 and that disturb the uniform light distribution otherwise produced. A seamless rear surface 18 is obtained not only because the rear surface 18 has a circular curvature defined by a single center of curvature but also because it is continuous and smoothly varying.

One limitation of the curved rear surface 18 depicted in FIGS. 7 and 8 is that the amount of light output, i.e., the flux, varies with the viewing angle θ. The reason for this variation in light output is that the extent of the rear surface 18 that is visible through the front face 16 depends on the viewing angle. Less of the rear surface, for example, is visible when viewed at an angle of θ=90° than when viewing the lighting apparatus 10 head-on, i.e., at an angle of θ=0°. Variation in the percentage of the rear surface 18 that is visible through the front face 16 causes light output to be dependent on viewing angle.

To minimize the dependency of flux on viewing angle, θ, the rear surface 18 is contoured such that a substantially constant spatial extent is visible for a wide range of viewing angles. Preferably, a substantially constant spatial extent is visible for a distribution of viewing angles in excess of about 180° (or ±90°). One design, shown in FIGS. 9 and 10, that provides uniform output over such a large field-of-view, includes a rear surface 18 comprising two sections 60 and 62 each having a frontward and a rearward substantially planar facet 64 and 66, oriented at an angle σ with respect to each other, that form an obtuse angle and a generally concave surface as seen from within the waveguide. In particular, the rear reflective surface 18 is concave as viewed from the cross-section perpendicular to the longitudinal axis (Z) of the waveguide. Light propagating within the waveguide will be reflected from this generally concave surface 18 frontward toward the front illumination surface 16 and exit therefrom. The angle σ may range from about 100 to about 130 degrees and is preferably about 120 degrees. Since the frontward planar facets 64 in each of the two portions 60 and 62 are parallel, the rearward facets 66 form an angle γ with respect to each other of between about 100° to 160° and preferably about 120°. In other embodiments, the values for γ and σ may be outside these ranges. As illustrated in FIGS. 9 and 10, the two portions 60 and 62 are symmetrical about the XZ plane and the forward faces 64 are parallel to the XZ plane. Consequently, a substantial fraction of the two forward facets 64 are not visible when viewing the lighting apparatus 10 approximately head-on, i.e., where θ=0°, along the X axis. The two rearward facets 66, however, are therefore visible from an angle θ=0° as these rear facets 66 are directed upward at an angle of 60° and downward at an angle of 60°, respectively, from the XZ plane. With this particular configuration, the visible portion of the concave rear surface 18 remains fixed over a plurality of view angles spanning 180° or more. Accordingly, this configuration is preferred; however designs that produce substantially constant exposure to the rear surface 18 over a smaller or larger range of angles (i.e., field-of-views) are possible. Other configurations are also desirable that provide for a substantially constant visible surface area when the rear surface 18 is viewed from any point on an arc subtending 180° or more that is centered about the longitudinal, Z, axis.

The extent that the visible surface area is constant over a range of viewing angles can be readily calculated for a rear surface 18 having a well-defined shape. The spatial extent or surface area visible from a specific point is governed by a well-known relation for projected surface area:

$$A_{projected} = A_{surface} \cos \beta$$

wherein $A_{projected}$ corresponds to visible or projected planar surface, $A_{surface}$ is the actual surface area of the rear surface 18, and β corresponds to the view angle, θ, but measured from a vector normal to the surface. A planar surface is characterized by a single normal vector, whereas a faceted surface is characterized by a plurality of normal vectors, one for each facet. A continuously varying curved surface has a continuously varying normal vector that is employed in calculating the projected surface area while integrating over the entire surface. The rear surfaces in FIGS. 4, 6, 8, and 10, are examples of planar, faceted and curvilinear rear surfaces 18.

As discussed above, the rear surface 18 preferably is contoured such that the projected surface area calculated for a continuous range of viewing angles, β, at least as great as 180° remains substantially constant. Waveguides 14 wherein the rear surface 18 and front surface 16 have respective surface areas $A_{rear}$ and $A_{front}$, having size and shape such that $A_{rear}$ is approximately equal to or greater than $A_{front}$ end to satisfy this requirement by providing for a fixed amount of illumination over a wide range of viewing angles. Such designs improve the performance of the lighting apparatus 10 because the spatial extent and quantity of illumination is not only sufficient to be detected by a viewer peering from a broad range of vantage points but is maximum over that range.

In addition to designing the rear surface 18 of the waveguide 14, the front face 16 may be shaped to direct the light emitted from the lighting apparatus 10 in a predetermined manner. For example, instead of having a circular curvature, the front surface 16 may be aspheric. This aspheric front face may provide a specific field-of-view to direct the output from the apparatus 10 or otherwise tailor the field-of-view or the angular distribution of light emanating from the apparatus.

Note that the waveguide 14, such as shown in FIGS. 5–10, or others, may be considered to be formed from a first and second waveguide portions, each of the portions comprising an elongate concave transmissive output surface and an elongate reflective surface. The two elongate waveguide portions are joined such that (i) the transmissive surfaces are in side-by-side relationship and such that (ii) the elongate reflective surfaces converge towards said forward side and flare outwardly toward said rearward side. The elongate waveguide portions may comprise separate structures contacted together or may be integrally formed as one such as, for example, by using a single mold in a process like injection molding. Preferably, however, the transmissive front continues smoothly from one portion to another.

Figure 11:
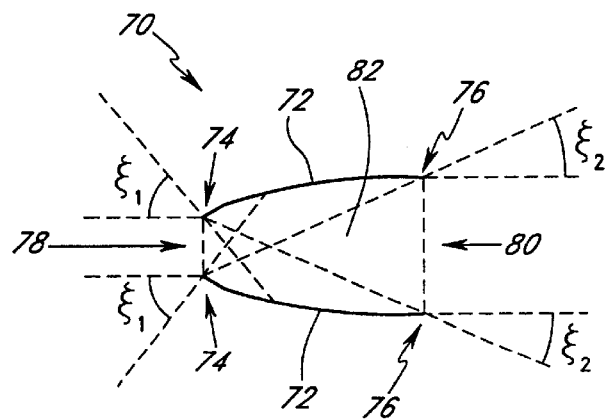
FIGS. 11–13 depict cross-sectional views of non-imaging optical elements comprising contoured sidewalls having forward and rearward edges that define first and second apertures, respectively, and having reflective surfaces shaped to pass light entering through the first aperture at an angle no more than $\pm\xi_1$ on through the second aperture at an angle no more than $\pm\xi_2$, wherein $\pm\xi_1 > \pm\xi_2$.
Figure 12:
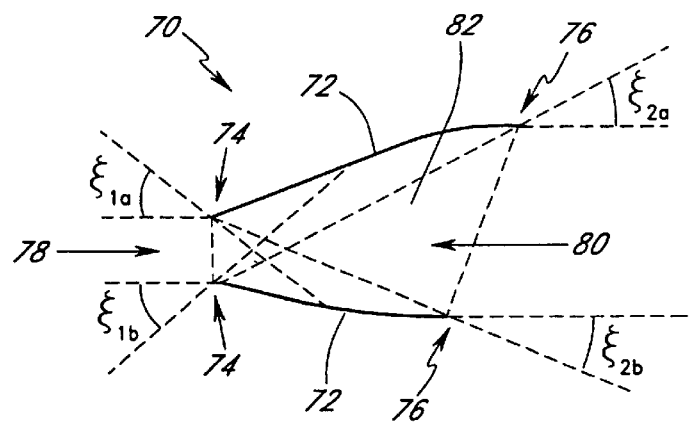
Figure 13:
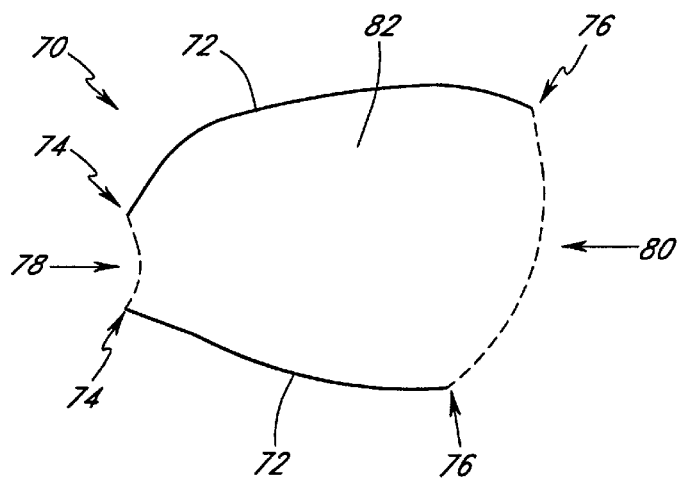

Performance of the lighting apparatus 10 can also be improved by more efficiently coupling light from the plurality of LED's 12 into the waveguide 14. One technique for enhancing coupling efficiency is by employing a non-imaging optical element as the collimating optical element 44 or as the collimator 46. Non-imaging optical elements are well-known; see e.g., *Integral Design Methods for Nonimaging Concentrators*, D. Jenkins and R. Winston, J. Opt Soc. Am. A, Vol. 13, No. 10, October 1996, pp. 2106–2116 and *Tailored Reflectors for Illumination*, D. Jenkins and R. Winston, Applied Optics, Vol. 35, No. 10, Apr. 1, 1996, pp. 1669–1672, both of which are incorporated herein by reference. Non-imaging optical elements 70, cross-sections of which are shown in FIGS. 11–13, may comprise one or more contoured reflective surfaces 72 delimited by rearward and forward edges 74, 76 that form boundaries for separate first and second apertures 78, 80. Confined between the reflective surfaces 72 is a cavity 82 that extends from the first aperture 78 and to the second aperture 80.

Well-known non-imaging optical elements 70 include mirror varieties having mirrors for reflective surfaces 72 as well as waveguide varieties having reflective surfaces that rely on total internal reflection. In the mirror varieties, the reflective surfaces 72 may comprise surfaces appropriately contoured and metalized to reflect light. In contrast, the waveguide varieties are created by shaping sidewalls of a transparent medium to cause light within the medium to reflect from the sidewalls in an appropriate direction via total internal reflection. In the waveguide variety, the cavity 82 is filled with a material such as glass or polymer-based materials having sidewalls that correspond to the reflective surfaces 72. The reflective surface 72 may be formed at a boundary between the sidewalls and air or at a boundary between the sidewall and a cladding layer surrounding the transparent medium, either of which are possible depending on how the non-imaging optical element 70 is implemented. Examples of material preferably employed as the transparent medium for the non-imaging optical element 70 include acrylic, polycarbonate, and silicone. In contrast with the waveguide variety, the cavity 82 in the mirror variety may be filled either with air or other transparent media. Reflection is provided by the metalization or material with high reflectivity and not by total internal reflection.

Figure 14:
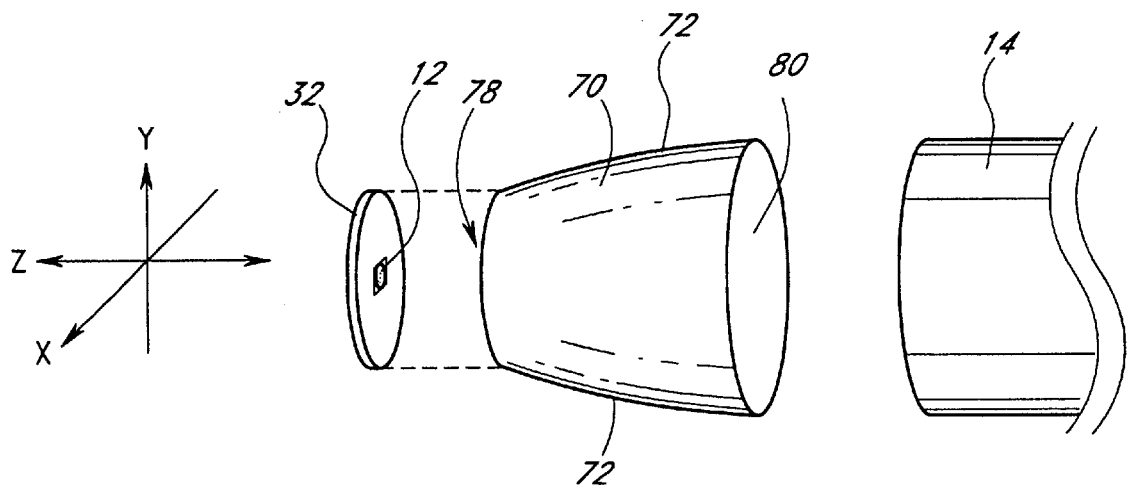
FIG. 14 shows an exploded view of a light source wherein the collimating element comprises a non-imaging optical element sandwiched between the plurality of LEDs and the waveguide.

As shown in FIG. 14, the non-imaging optical element 70 is preferably disposed between the plurality of LEDs 12 and the waveguide 14 so as to match the numerical aperture (NA) of the waveguide to that of the emitted radiation of the LED light sources, the first aperture 78 adjacent the LEDs 12 and the second aperture 80 adjacent the waveguide. The plurality of LEDs 12 is shown as a two-dimensional array having a center, and the reflective surface 72 is circular symmetric about the longitudinal axis Z centered about the waveguide 14, and which passes through the center of the LED array. The first and second aperture may range in size between about 0.25 inch to about 1.0 inch and between about 0.5 inch to about 4.0 inches in diameter, respectively. Other sizes are considered possible as well. A distance of about 0.5 inch to 2.0 inches may separate the two apertures 78, 80; but the distance need not be limited to this range.

Figure 15:
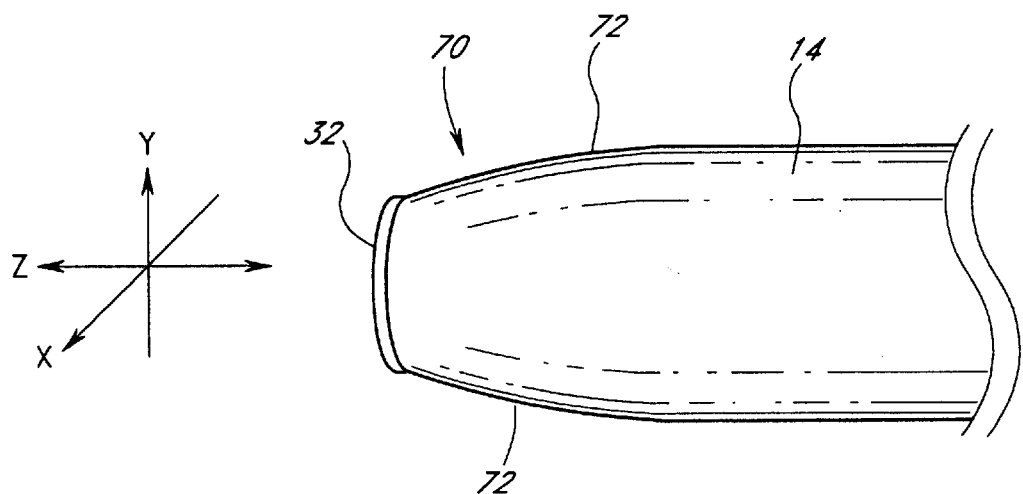
FIG. 15 is a perspective view of a portion a lighting apparatus wherein the plurality of LEDs mounted on a printed circuit board abut a waveguide having a non-imaging optical element formed integral therewith.

Preferably, the non-imaging optical element 70 is of the waveguide variety and more preferably, similar or identical material is employed as the transparent medium forming the non-imaging optical element and that forming the waveguide 14. Additionally, the non-imaging optical element 70 may be fused to the waveguide 14, as illustrated in FIG. 15. In particular, the waveguide 14 may be fabricated using a mold that also provides for the non-imaging optical element 70 as well as for the waveguide. Forming the waveguide 14 and the non-imaging optical element 70 from the same mold, thereby integrating the two elements into a single continuous guide simplifies manufacturing, improves structural integrity, and reduces reflection loss that might otherwise occur where the non-imaging optical element adjoins the waveguide.

The non-imaging optical element 70 couples light from the plurality of LEDs 12 into the waveguide 14. Light from the LED's 12 propagates through the first aperture 78, possibly reflecting from the reflective sidewalls 72, exits the non-imaging optical element 70 through the second aperture 80, and is directed into the waveguide 14. As is well-known, non-imaging optical elements 70 are especially suited for redirecting a substantially large portion of light incident on the first aperture 78 at an angle no more than $\pm \xi_1$ through the second aperture 80 at an angle no more than $\pm \xi_2$.

Accordingly, a given non-imaging optical element 70 can be characterized by its input field-of-view ±ξ$_1$ and its exit field-of-view ±ξ$_2$.

Preferably, the non-imaging optical element 70 employed in the lighting apparatus 10 has an input field-of-view ±ξ$_1$ exceeding its output field-of view ±ξ$_2$. As discussed above, LEDs emit light over a wide range of angles. In contrast, a substantially collimated beam provides for increased uniformity in light output across the length of the waveguide 14. Accordingly, a non-imaging optical element 70 that is capable of receiving light incident thereon from a wide range of angles and efficiently coupling this light into a beam having a minimal divergence is preferred. In particular, preferably the non-imaging optical element 70 has an input field-of-view ±ξ$_1$ between about ±30° and ±90° and an output field-of-view ±ξ$_2$ between about ±5° and ±30° and a coupling efficiency therebetween in the range of about 70 and 95% but may have field-of-views or coupling efficiencies outside these ranges. The reflective surfaces 72 are shaped to maximize coupling of light entering the non-imaging optical element 70 at an angle no more than ±ξ$_1$ into collimated light having divergence of not greater than ±ξ$_2$. Techniques for selecting the appropriate shape for specific values of ±ξ$_1$ and ±ξ$_2$ are well-known and include, in particular, those described in *Integral Design Methods for Nonimaging Concentrators*, D. Jenkins and R. Winston, J. Opt Soc. Am. A, Vol. 13, No. 10, October 1996, pp. 2106–2116 and *Tailored Reflectors for Illumination*, D. Jenkins and R. Winston, Applied Optics, Vol. 35, No. 10, Apr. 1, 1996, pp. 1669–1672, which are incorporated herein by reference.

Figure 16:
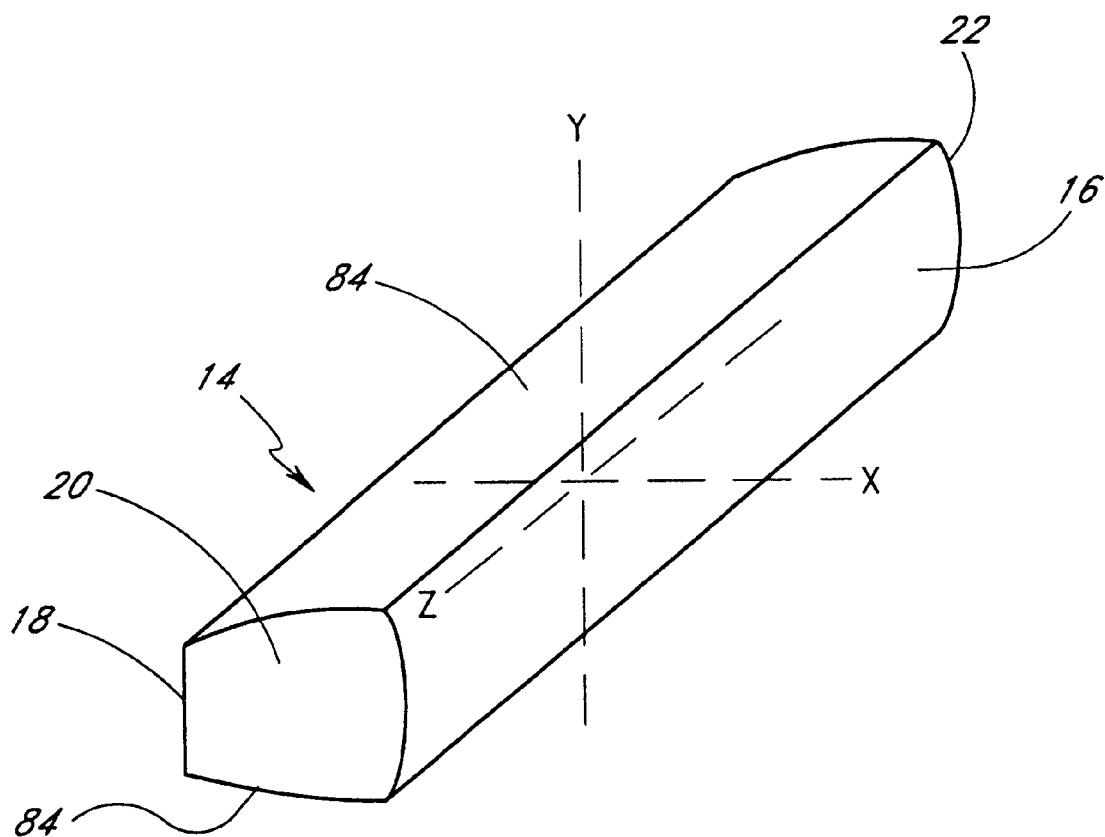
FIG. 16 depicts a perspective view of the waveguide having upper and lower surfaces that form a non-imaging optical element for controlling the field-of-view of the lighting apparatus.
Figure 17:
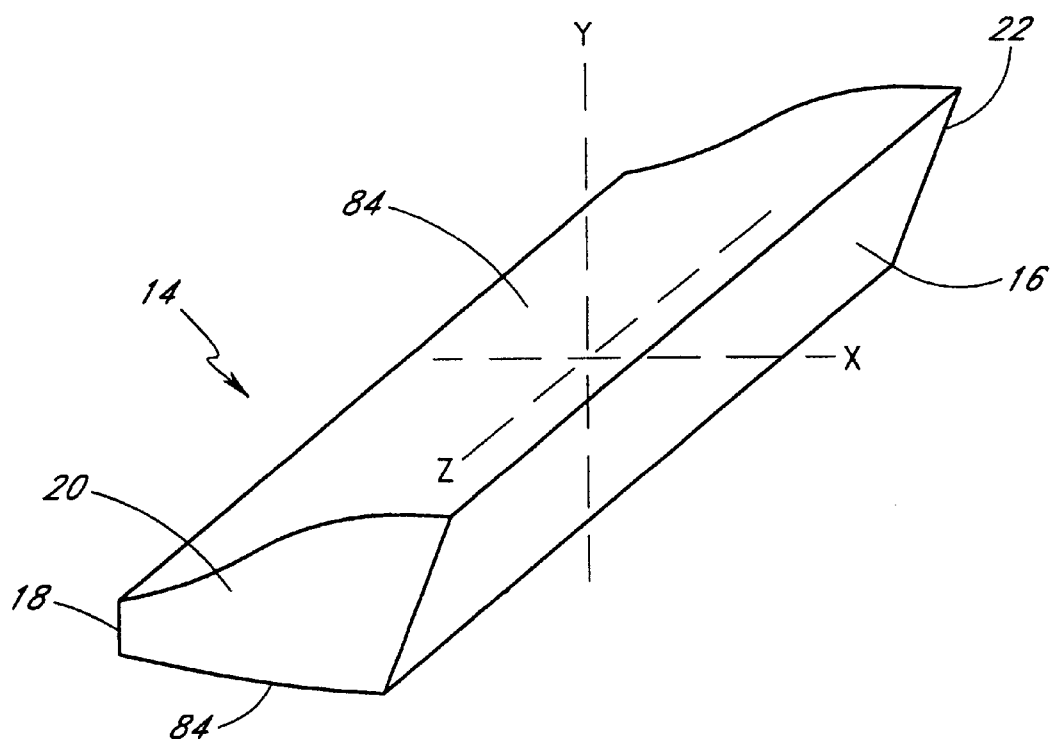
FIG. 17 shows a perspective view of an asymmetric waveguide that provides an asymmetric field-of-view.

Non-imaging optics can also be employed in designing waveguides 14 that efficiently couple light scattered off the rear reflecting surface 18 into a narrow field-of-view, which can be either symmetric or asymmetric, depending upon application. As shown in FIGS. 16 and 17, the waveguide 14 may include top and bottom surfaces 84, in addition to the curved or flat front illumination surface 16 and curved or flat reflecting (diffusely or specularly) rear surface 18 discussed above. The top and bottom surfaces 84 preferably are specularly reflective. To provide for specular reflectivity, the surface may comprise metal or dielectric stacks or may comprise material having an index of refraction that causes light within the guide 14 to reflect by total internal reflection (TIR). As in the embodiments discussed above, the front and rear surfaces 16 and 18 need not be limited to curved and planar surfaces, respectively. Rather, either of the front surface 16 and the rear surface 18 may be planar or curved. Unlike in the non-imaging optical element 70 employed as a collimator element 44, the reflective surfaces 72 shown as the upper and lower surfaces 84 in FIG. 16 are not circularly symmetric, but rather form sheets extending longitudinally, i.e., in the Z direction, along the length of the waveguide 14. These sheets 84, however, are symmetric about the XZ plane.

The lighting apparatus 10 that employs a waveguide 14 such as that shown in FIG. 16 operates in like manner to that described above except that the upper and lower surfaces 84 are shaped so as to narrow the divergence of the beam exiting the front face 16. Light from a light source such as a plurality of LEDs 12 that is preferably collimated is coupled, for example, by another non-imaging optical element, into the input surface 20 of the waveguide 14. This light propagates through the waveguide 14, part scattering off the diffusely reflecting surface in the rear and part continuing onto the reflective side surface 22. Light reflected off the reflective side 22 surface propagates back toward the light source and the input surface 20; a significant portion of this light may be scattered off the diffusely reflective surface 18 in the rear while traversing the waveguide 14. The diffusely reflective rear surface 18 is lambertian, and thus light scatters therefrom in all directions. Some of this light directed toward the front will exit directly through the front face 16 of the waveguide 14. Other rays of light will reflect off the upper and lower surfaces 84, which are shaped to direct this reflected light in a limited range of directions. In this manner, the shape of the upper and lower surfaces 84, being reflective surfaces 72 of a non-imaging optical concentrator 70, control the divergence of light emitted from the front face 16 and likewise determines the field-of-view of the lighting apparatus 10.

Since the upper and lower surfaces 84 are symmetric about the XZ plane in the waveguide 18 depicted in FIG. 16, the field-of-view is symmetric about the XZ plane. As shown in FIG. 17, the upper and lower surfaces 84, need not be symmetric, in which case, the field-of-view will not be symmetric about the XZ plane. In particular, the reflective surfaces 72 can be contoured to provide asymmetric field-of-views either at the first or second apertures 78 and 80; see, e.g., FIG. 12. Light within a range defined by angles +ξ$_{1a}$ and −ξ$_{1b}$ can be received by the non-imaging optical element 70 at the first aperture 78 while light within a range defined by angles +ξ$_{2a}$ and −ξ$_{2b}$ can be output by the non-imaging optical element at the second aperture 80, wherein, e.g., +ξ$_{1a}$≠−ξ$_{1b}$ and +ξ$_{2a}$≠−ξ$_{2b}$. The non-imaging optical element 72 shown in FIG. 13 also provides asymmetric field-of-views. Asymmetric field-of-views are useful for controlling the direction of light emitted from the lighting apparatus 10.

As discussed above, the shape of the upper and lower surfaces 84 that provides the desired field-of-view can be determined from well-known techniques such as those in *Integral Design Methods for Nonimaging Concentrators*, D. Jenkins and R. Winston, J. Opt Soc. Am. A, Vol. 13, No. 10, October 1996, pp. 2106–2116 and *Tailored Reflectors for Illumination*, D. Jenkins and R. Winston, Applied Optics Vol. 35, No. 10, Apr. 1, 1996, pp. 1669–1672, contained in APPENDIX I. Examples are briefly described below.

A waveguide that produces a limited field-of-view can be provided with the upper and lower surfaces having shapes defined by Equation 6 in *Integral Design Methods for Nonimaging Concentrators*, D. Jenkins and R. Winston, J. Opt Soc. Am. A, Vol. 13, No. 10, October 1996, pp. 2106–2116. The waveguide may include a θ$_1$–θ$_2$ angle transformer described in Section 3 of *Integral Design Methods for Nonimaging Concentrators*, D. Jenkins and R. Winston, J. Opt Soc. Am. A, Vol. 13, No. 10, October 1996, pp. 2106–2116. Total internal reflection may be added as a constraint. The angle θ$_2$ may be chosen to be 90 degrees or less, depending on the properties of the diffusely reflecting surfaces. The waveguide may comprise an asymmetric θ$_1$–θ$_2$ angle transformer where θ$_1$ (and possibly θ$_2$) can be different above and below the XZ plane yielding an asymmetric illumination pattern and field-of-view. The waveguide may include a tailored illuminator as described in Section 3 of *Tailored Reflectors for Illumination*, D. Jenkins and R. Winston, Applied Optics, Vol. 35, No. 10, Apr. 1, 1996, pp. 1669–1672. Although the example shown in Section 3 is applicable to a curved or circular light source, the design method is generic and may be equally well applied to a flat scatter source or flat diffusely reflecting surface.

Thus, an extended light source 10 is provided that includes a sizable extended region 18 that appears to a viewer to be substantially uniformly lit from a wide fieldof-view. Furthermore, since these extended light sources 10 produce a uniform illumination, i.e., one without irregularities and variation in brightness, the extended light source is aesthetically pleasing to the consumer. This extended light source 10, therefore, can be employed as a decorative strip or band light. This light apparatus 10 is also suitable for other forms of commercial, industrial, and residential lighting where there is a desire to replace neon, or more generally cold cathode fluorescent lights, with contour-following luminaries that are quite strong, operate on low DC voltage, and therefore do not pose the high-voltage electrocution risk that accompanies neon lighting. In addition, the lighting apparatus 10 described above can utilize LED lighting, which offers significant lifetime advantages over neon and fluorescent lamps, since the lifetime of an LED corresponds to about 20,000 to 100,000 hours, while that for a typical neon and fluorescent lamps is about 10,000 to 20,000 hours.

These extended light sources 10, however, are not limited to use as replacements for neon or fluorescent light strips but are suitable for other applications, as well. The extended light sources 10 may, for example, be employed instead of chemi-luminescent sticks or rods which are available in a variety of colors including blue, green, yellow and orange. Like chemi-luminescent sticks, the lighting apparatus 10 described above can serve as handheld markers for nighttime applications such as in airports to guide airplanes taxing, at scenes of an accident to warn oncoming drivers of an emergency situation, and underwater by SCUBA divers to let other divers know of their whereabouts. These extended light sources 10 are also useful for military applications as well as in camping. In contrast to the lighting apparatus 10 described above having one or more LEDs 12 as a light source, luminescent sticks that are currently available employ a chemical reaction to produce a colored glow emanating from the stick. Although these chemical light sources do not require flames or batteries to produce light, they have a limited lifetime which may range between about 8 to 12 hours. Moreover, the intensity of light emitted by these chemical sticks diminishes rapidly during use. For example, after 2 minutes, the intensity of light is reduced to about 36% of its original value. After 30 minutes, it is reduced by about 15% of its original value and then after 2 hours, it is reduced to about 7% of its original value. For more detail, see TABLE I which illustrates the reduction in output intensity of the chemical stick over time. In contrast to the chemi-luminescent stick, the lighting apparatus 10 described above, has a relatively long lifetime and an output intensity that does not rapidly diminish with time. In addition, the lighting apparatus 10, describe above, provides wide field-of-view illumination that is substantially uniform over a sizable region and is therefore attractive.

TABLE 1

INTENSITY DECAY FOR A GREEN CHEMICAL LUMINESCENT STICK

| TIME (minutes) | BRIGHTNESS (foot-lambert) |
|---|---|
| 0 | 137 |
| 2 | 50.0 |
| 4 | 40.0 |
| 6 | 37.0 |
| 7 | 34.5 |
| 10 | 28.9 |
| 12 | 27.9 |
| 15 | 27.9 |
| 18 | 26.3 |

TABLE 1-continued

INTENSITY DECAY FOR A GREEN CHEMICAL LUMINESCENT STICK

| TIME (minutes) | BRIGHTNESS (foot-lambert) |
|---|---|
| 20 | 24.0 |
| 23 | 23.0 |
| 25 | 21.4 |
| 30 | 19.6 |
| 35 | 18.0 |
| 45 | 15.9 |
| 50 | 14.2 |
| 55 | 13.6 |
| 120 | 9.0 |

The present invention may be embodied in other specific forms without departing from the essential characteristics as described herein. The embodiments described above are to be respects as illustrative only and not restrictive in any manner. The scope of any invention is, therefore, indicated by the following claims rather than the foregoing description. Any and all changes which come within the meaning and range of equivalency of the claims are to be considered in their scope.

What is claimed is:

1. An illumination apparatus, comprising:
   an elongated waveguide having proximal and distal ends and a central longitudinal axis, said waveguide comprising an elongated forward side for outputting light and an elongated rearward side for reflecting light towards the forward side, said rearward side comprising an elongated reflective surface;
   a source of light comprising a solid state light emitter on the proximal end of the waveguide; and
   an optical collimating element disposed between the waveguide and the source of light, which introduces light into the waveguide in the form of a substantially collimated beam having a divergence angle a, said waveguide having a width at the distal end approximately equal to 2 L tan (α), where L is the length of the waveguide between said ends.

2. The illumination apparatus of claim 1, wherein said waveguide has an asymmetric cross-section perpendicular to said central longitudinal axis and said width corresponds to a smallest width.

3. The illumination apparatus of claim 1, wherein said solid state light emitter comprises a light emitting diode (LED).

4. The illumination apparatus of claim 3, wherein said source of light further comprises at least one lens for coupling light from said light source into said elongate waveguide.

5. The illumination apparatus of claim 3, wherein said source of light further comprises a nonimaging optical element for coupling light from said light source into said elongate waveguide.

6. The illumination apparatus of claim 1, wherein said elongate reflective surface is diffusely reflective to scatter light propagating within said waveguide out said forward side through said elongate concave transmissive output surface.

7. The illumination apparatus of claim 6, wherein said elongate reflective surface includes a diffusely reflective layer formed thereon.

8. The illumination apparatus of claim 1, wherein said distal end has a reflective surface that reflects light back toward said proximal end.

9. The illumination apparatus of claim 8, wherein said width corresponds to said width of said reflective surface.

10. The illumination apparatus of claim 8, wherein said reflecting surface is oriented at a non-perpendicular angle with respect to said longitudinal axis.

11. The illumination apparatus of claim 1, wherein said elongate waveguide comprises material substantially optically transmissive to visible light.

12. The illumination apparatus of claim 11, wherein said elongate waveguide comprises material selected from the group consisting essentially of plastic and glass.

13. The illumination apparatus of claim 12, wherein said elongate waveguide comprises material selected from the group consisting essentially of acrylic, polycarbonate, and silicone.

14. The illumination apparatus of claim 1, wherein said elongate waveguide has a length ranging between about 4 inches to about 8 feet.

15. The illumination apparatus of claim 14, wherein said elongate waveguide has a width perpendicular to said length ranging between about ¼ inch to about 2 inches.

* * * * *

UNITED STATES PATENT AND TRADEMARK OFFICE
CERTIFICATE OF CORRECTION

PATENT NO.    : 6,637,924 B2
DATED         : October 28, 2003
INVENTOR(S)   : David G. Pelka and William A. Parkyn It is certified that error appears in the above-identified patent and that said Letters Patent is hereby corrected as shown below:

Title page,
Item [56], References Cited, OTHER PUBLICATIONS, "N. C. Greenham et al.," delete all but one space between "nanocrystal" and "composites"

Column 3,
Line 37, after "portion" insert -- of --.

Column 5,
Line 11, delete "a" and insert -- $a$ -- therefor.
Line 12, delete "filly" and insert -- fully -- therefor.

Column 6,
Line 25, delete "produces" and insert -- produce -- therefor.

Column 9,
Line 46, delete "a" and insert -- $a$ -- therefor.

Column 10,
Line 18, delete "piano" and insert -- plano -- therefor.
Line 34, delete "ΦFOV" and insert -- $\Phi_{FOV}$ -- therefor.

Column 11,
Line 30, delete "section" and insert -- sections -- therefor.

Column 12,
Line 1, delete "comers" and insert -- corners -- therefor.

Column 13,
Line 20, delete "end" and insert -- tend -- therefor.

Column 17,
Line 27, delete "taxing" and insert -- taxiing -- therefor.
Line 49, delete "describe" and insert -- described -- therefor.
Line 54, delete "TABLE 1" and insert -- TABLE I -- therefor.

UNITED STATES PATENT AND TRADEMARK OFFICE
CERTIFICATE OF CORRECTION

PATENT NO.      : 6,637,924 B2
DATED           : October 28, 2003
INVENTOR(S)     : David G. Pelka and William A. Parkyn It is certified that error appears in the above-identified patent and that said Letters Patent is hereby corrected as shown below:

Column 18,
Line 3, delete "TABLE 1" and insert -- TABLE I -- therefor.
Line 20, insert -- considered in all -- between "be" and "respects".

Signed and Sealed this

Third Day of May, 2005

JON W. DUDAS
*Director of the United States Patent and Trademark Office*